May 23, 1933.  E. A. SPERRY, JR., ET AL  1,911,168
AUTOMATIC STEERING FOR DIRIGIBLE CRAFT
Filed Nov. 20, 1929  4 Sheets-Sheet 3
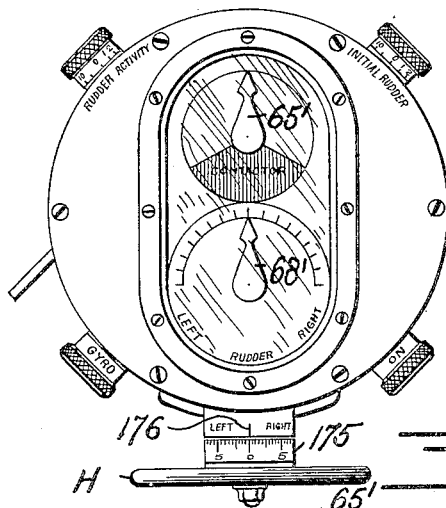
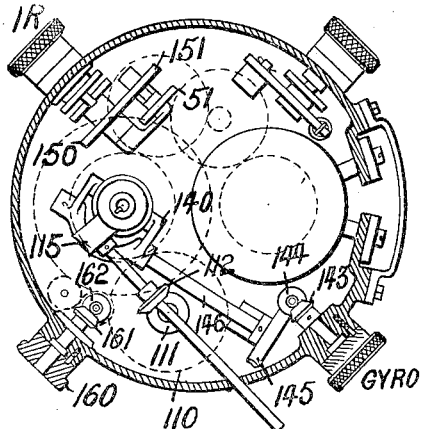
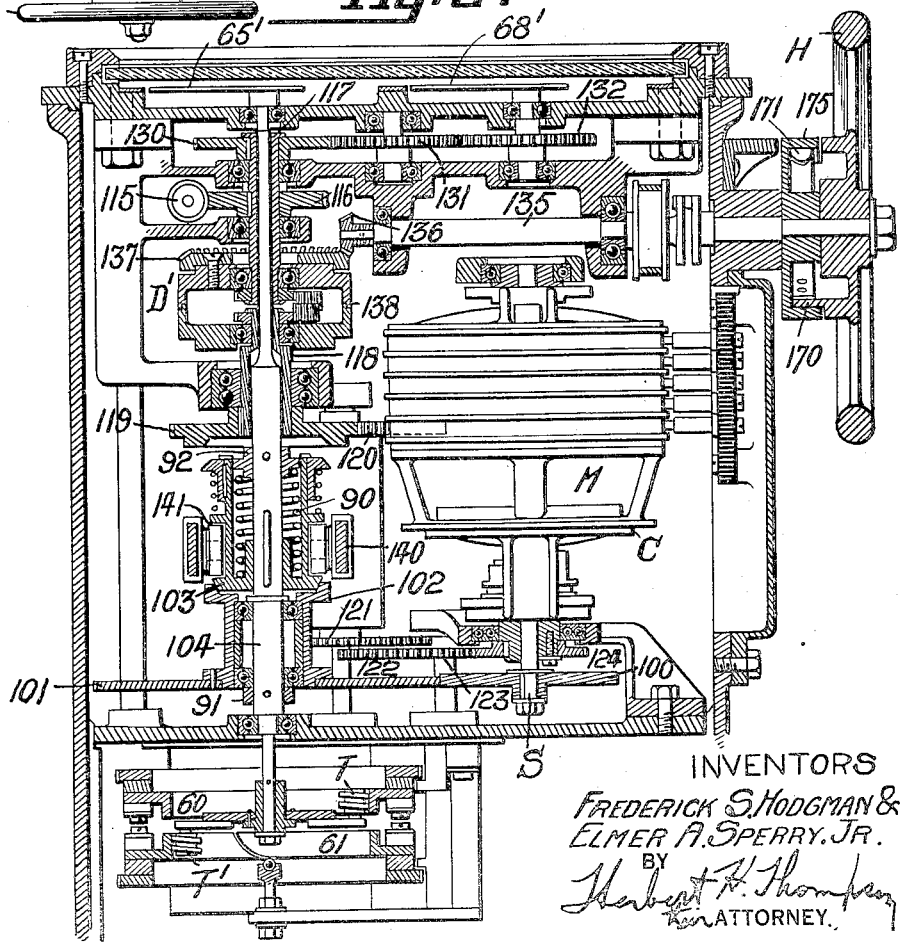
INVENTORS
FREDERICK S. HODGMAN &
ELMER A. SPERRY, JR.
BY
Herbert H. Thompson
ATTORNEY.

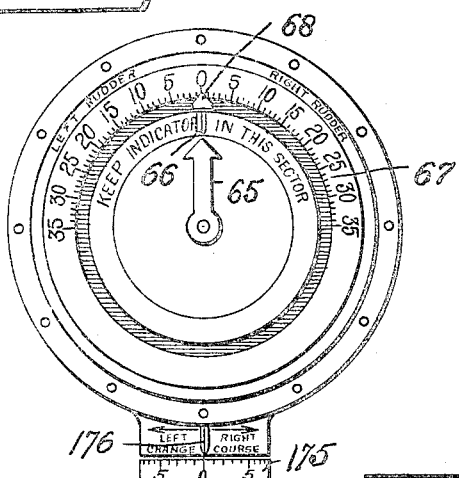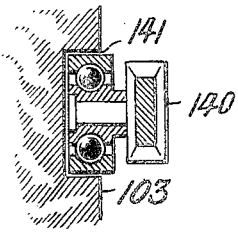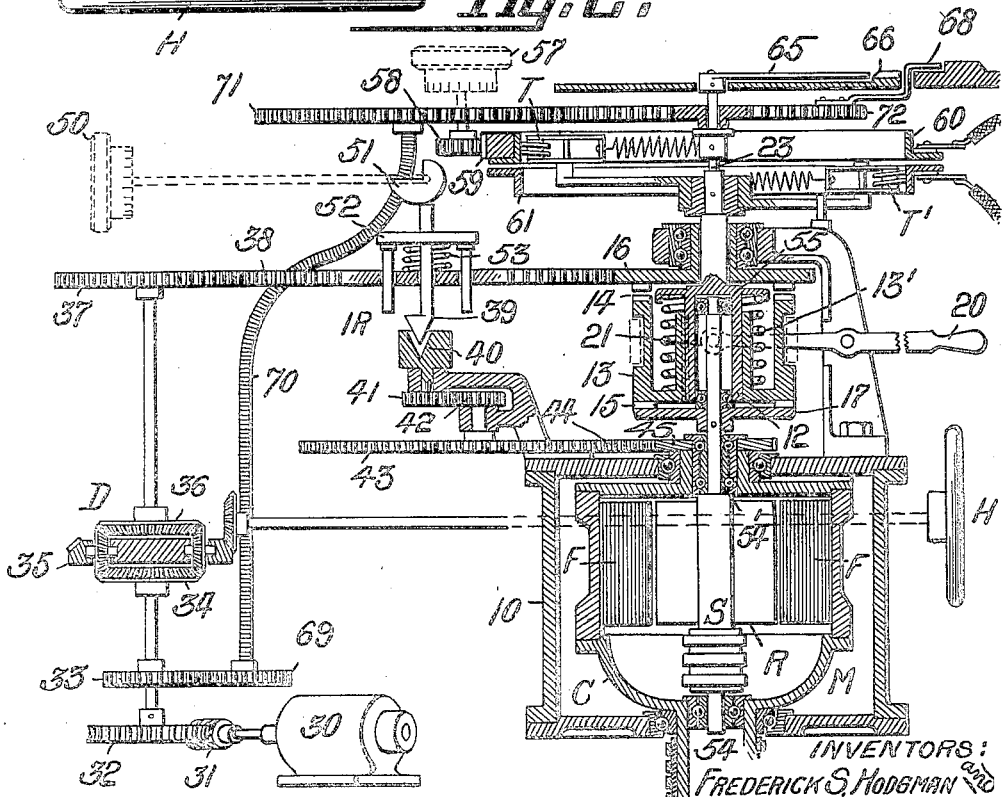

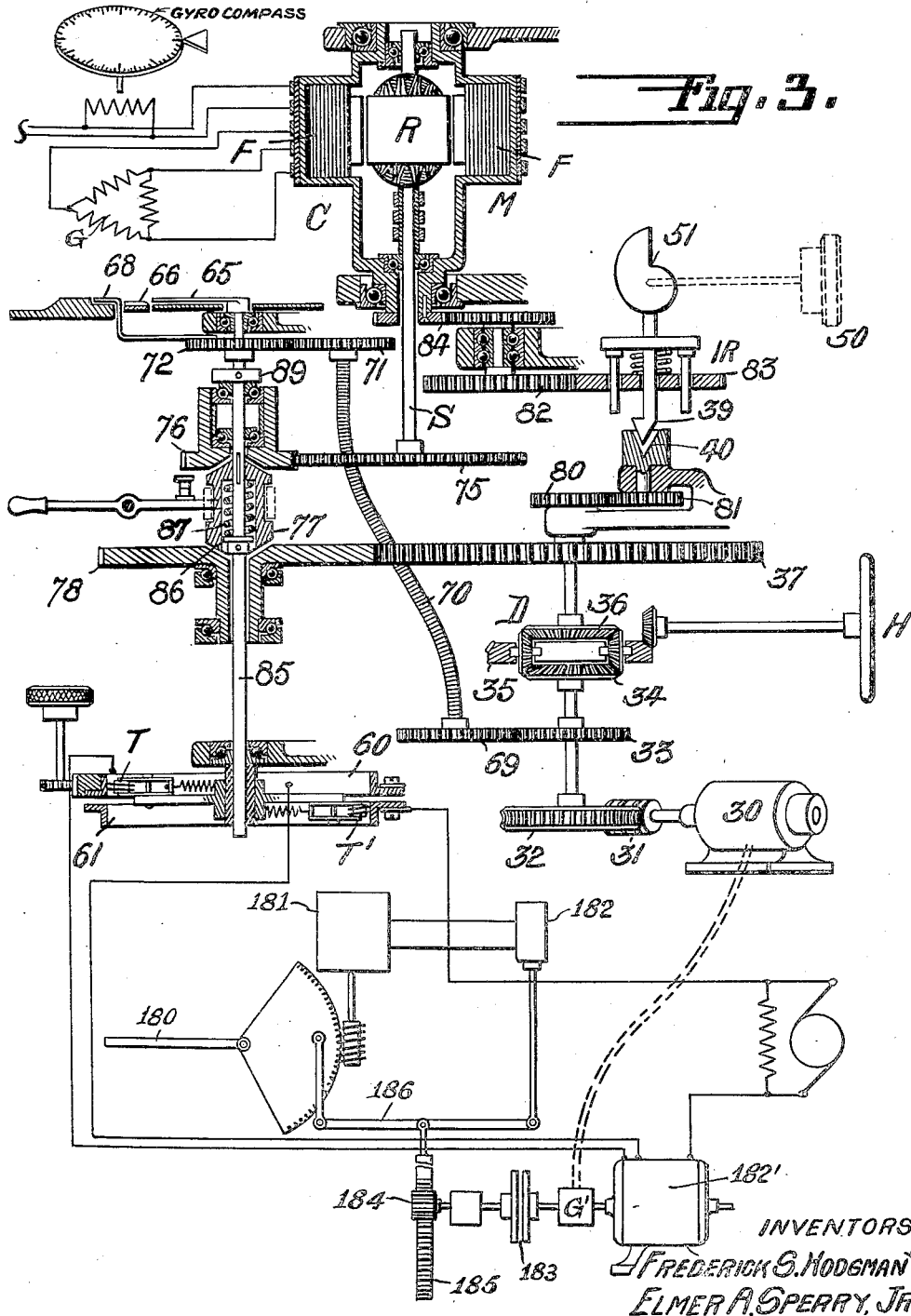

May 23, 1933.  E. A. SPERRY, JR., ET AL  1,911,168
AUTOMATIC STEERING FOR DIRIGIBLE CRAFT
Filed Nov. 20, 1929  4 Sheets-Sheet 4

INVENTORS
FREDERICK S. HODGMAN &
ELMER A. SPERRY, JR.
BY
Herbert H. Thompson
Their ATTORNEY Patented May 23, 1933

1,911,168

UNITED STATES PATENT OFFICE

ELMER A. SPERRY, JR., OF BROOKLYN, NEW YORK, AND FREDERICK S. HODGMAN, OF GLEN ROCK, NEW JERSEY, ASSIGNORS TO SPERRY GYROSCOPE COMPANY, INC., OF BROOKLYN, NEW YORK, A CORPORATION OF NEW YORK

AUTOMATIC STEERING FOR DIRIGIBLE CRAFT

Application filed November 20, 1929. Serial No. 408,461.

This invention relates to automatic steering of dirigible craft and is particularly adapted to systems wherein the control of the automatic steering device from the master compass as a baseline is effected through an A. C. transmission system. In such a system as applied to the automatic steering of dirigible craft, several problems arise that require a special solution. In the first place the movements of the compass are transmitted by an A. C. transmitter to a self-synchronous A. C. repeater motor and upon said repeater motor is placed the burden of operating a contact system for controlling the rudder. It is a characteristic of such a repeater motor that the torque which it delivers is a function of the angular displacement of the rotor with respect to the motor fields. It will be seen that very little torque can be gotten out of such a repeater motor for small movements of the rotor. It is, therefore, necessary to relieve the rotor of every possible source of retardation, that is to say, to relieve it of all possible load. To this end the repeater motor shaft does not operate, as in D. C. systems now in use, through one side of a differential in order to actuate the contact system, the rudder operating in a follow-back through the other side of said differential, but we cause the rotor shaft to operate directly to the trolleys and by-pass the usual differential. This necessitates making provision for a follow-up and we accomplish this by causing the rudder to operate in a follow-back connection directly to the casing of the repeater motor which carries the motor fields so that said rotor is dragged back to initial position.

As a further expedient to relieve the rotor of load, we avoid placing on said rotor the thrust pressure delivered by the usual clutch mechanism through which hand or automatic steering of the craft is selectively effected; and for this purpose we cause the thrust to be taken up in the shaft itself and not by the fixed bearings which support said shaft.

It is a further object of our invention to provide in an automatic steering mechanism for dirigible craft a two-part repeater motor controlled from a master compass by an A. C. transmitter, and in which one part of said motor responds to deviations from course while the other part thereof is actuated mechanically in a follow-up drive from the rudder. The action thus obtained in the case of an A. C. motor is first a displacement of the rotor with respect to the fields and, secondly, a movement wherein the field drags the rotor back to initial position. In such a construction, an operator may cause a change of course by shifting the field which drags the rotor therewith.

A further object of this invention is the provision of a two-part hand electric steering system whereby the order to the rudder is sent through one part and the answer-back from the rudder is effected through the other part. When steering automatically this construction permits the operator to change the course for an exact, desired amount by displacing one of said parts, as for instance the fields, to cause the rotor to be dragged thereby through a corresponding angle of movement, as may be indicated on a scale movable with the part thus moved by the operator.

A further object of this invention is the utilization of the structure set forth in the preceding paragraph in connection with hand-electric steering, whereby it is possible for the operator to transmit by hand the exact desired amount of rudder while a follow-back from the rudder shows that the latter has complied with the transmitted order.

A further object of our invention is the provision of means whereby a dirigible craft may be steered automatically or by hand at the will of the operator and wherein during hand steering an instantaneous response of the rudder is obtained. This has not been the case in prior systems because the hand steering and the automatic steering mechanisms operated through an initial rudder setting which provided lost motion whereby an overthrow of the rudder and a consequent meeting action were obtained. During hand steering, however, it is desirous that instantaneous response of the rudder be obtained, and in prior systems it was necessary first to bring the initial rudder setting to zero to eliminate said lost motion before steering by hand could properly be performed. By our invention this last operation is rendered unnecessary since we provide means for automatically by-passing the initial rudder setting mechanism when the device is rendered effective for hand steering.

Further objects and advantages of this invention will become apparent in the following detailed description thereof:

In the accompanying drawings,

Fig. 1 is a plan view of the controlling instrument embodying one form of our invention.

Fig. 2 is a vertical section through Fig. 1 and also an assembly of this form of automatic steering mechanism.

Fig. 3 is a view similar to Fig. 2 but disclosing a slightly modified form of our invention.

Fig. 4 is a plan view of the controlling instrument disclosed in Fig. 5.

Fig. 5 is a vertical section through Fig. 4 and disclosing a further modification of our invention.

Fig. 6 is a horizontal section taken just beneath the dial plate of Figs. 4 and 5.

Fig. 11 is a further detail of the clutch-operating mechanism and disclosing in vertical section one of the bearings.

Fig. 12 is an enlarged detail of the trolley mechanism.

Figure 7:
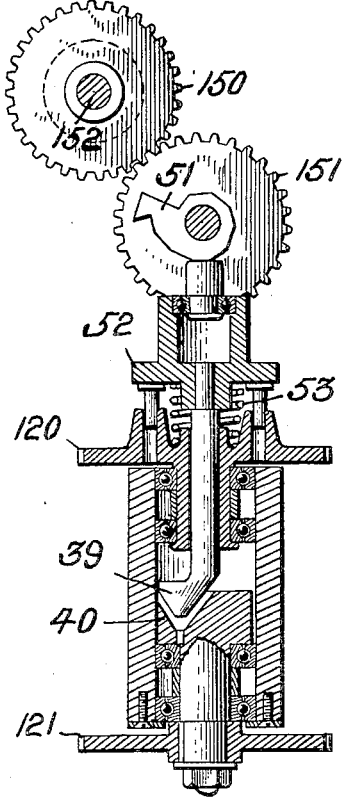
Fig. 7 is an enlarged view, partly sectioned vertically, through the initial rudder setting mechanism employed in the Figs. 4 to 6 form of the invention.

Referring now to the Figs. 1 and 2 form of the invention, there is shown a simple embodiment of one form thereof. It will be seen that there is disclosed a repeater motor indicated generally by the letter M, which may be enclosed within a fixed casing 10. Said motor may comprise a rotor R mounted on a rotor shaft S and a casing C having fixed thereto the fields F. It will be observed that the shaft S and the casing C are both rotatable and that the shaft S has a direct connection to trolley members T—T', while the casing C is driven by a mechanical connection from the rudder follow-up repeater motor 30 to repeat the movements of the rotor R in such direction as to restore shaft S (and trolley member T, T') to initial position. It will be understood, of course, that the primary action of the repeater motor M is governed from the transmitter on a gyro compass. Such a transmitter must be of the same type as the self-synchronous A. C. repeater motor and in Fig. 3 the gyro compass transmitter is illustrated diagrammatically at G. The aforementioned follow-up motor 30 is also driven from a suitable transmitter G' connected to the steering gear in some manner so that the follow-up from the rudder is introduced into the controller through the repeater motor 30. As shown in Fig. 3 the ship's rudder is illustrated diagrammatically at 180, a standard steering engine for driving the same at 181, the valve mechanism 182 of which is operated differentially from the reversible motor 182' operated from control contacts T and T'. As shown the motor 182' operates through the clutch 183 and pinion 184, a rack bar 185 which moves cross link 186. One end of said link is shown connected to a valve 182 and the other end is connected to the rudder so that a follow-up connection is obtained for the steering engine. These parts, however, may assume any suitable form and have many well known forms, the illustration being merely to represent diagrammatically a power steering gear. Referring back to the specific elements of the controller, the shaft S of rotor R is shown as extending upwardly within a sleeve 12 which has keyed on its outer surface a second sleeve 13 provided with upper and lower sets of clutch teeth 14 and 15 adapted to cooperate with upper and lower clutch plates 16 and 17, respectively, in response to movement of the sleeve 13 upwardly or downwardly by means of operating handle 20 having forked engagement with sleeve 13 as shown at 21. Clutch plate 17 is pinned to shaft S so that when sleeve 13 is clutched to plate 17, shaft S drives through said plate, sleeve 13, sleeve 12 to the trolleys T and T' carried by the shaft 23 and extending upwardly from said sleeve 12. It is thus apparent that a direct connection between the rotor shaft and the trolleys is obtained without the inter-position of load such as, for example, the usual differential mechanism through which the motor shaft and the follow-up have heretofore operated. Very little load is thus placed upon the rotor and even small deviations of the craft from the course to cause small displacement of rotor shaft S will be sufficient to actuate trolleys T—T'.

It will be understood that as in previous automatic steering devices the rotation of trolleys T and T' cause the same to move out of contact with insulated segments and into engagement with live segments of their respective contact rings 60 and 61 to energize the rudder operating motor to operate the rudder in a direction to bring the craft back to course. In so operating, the rudder actuates a follow-up system for energizing follow-up motor 30. A follow-up is provided to prevent unnecessarily great actuation of the rudder and said follow-up takes the form of a mechanical drive from the follow-up motor 30 to the casing C of the motor M to rotate the casing and its fields F in such direction as to return the rotor R to its initial position. This drive may take the form of gearing 31, 32, 33, 34, the last gear forming one side of a differential D, the rotating member 35 of which is held fixed by the hand control H. The drive continues through the other side 36 of differential D, the gears 37, 38, the initial rudder setting IR including the lost motion members 39-40, and thence through gearing such as 41-42-43-44 to a pinion 45 fixed to the casing C. The connections between motor 30 and casing C are, of course, such that the direction of operation of casing C is such as to drag the rotor R back to its initial position and hence return the trolleys T and T' to the insulated segment. The initial rudder setting may be effected by the usual means, such as knob 50 rotating a cam 51 to operate a carriage 52 against the action of a spring 53 to move cone 39 inwardly or outwardly from cone groove 40, to vary the amount of initial rudder, that is, the amount of overthrow of the rudder which is thus effective to exert a meeting action on the craft.

Should it be desired to change the course while the handle 20 is in position for automatic steering, it will be seen that the rotation of hand-wheel H will operate through the planetary member 35 of differential D to impart movement to gear 36 and hence to the casing C to cause said casing to rotate through the desired angle, and hence drag rotor R through the corresponding angle to displace trolleys T and T' and thus cause actuation of the rudder through the energization of the rudder-operating motor.

Spring 13' normally maintains clutch 13 in engagement with clutch plate 17 to maintain the automatic steering mechanism effective. In order to render the automatic steering mechanism ineffective and the hand steering mechanism effective, we operate handle 20 against the action of spring 13' to disengage clutch members 15 and clutch plate 17 and cause clutch members 14 and 16 to engage. It will thus be seen that the rotor R is no longer effective to control trolleys T and T' since the connection between rotor R and the trolleys has been broken. Hand electric steering is now effective through operation of handle H operating through differential D, gearing 37-38, plate 16, sleeve 13, sleeve 12, to the trolleys T and T'. It will thus be apparent that the drive during hand electric steering is no longer through the initial rudder mechanism, and hence it is no longer necessary, as was heretofore the case, to first operate said initial rudder mechanism until there was no lost motion between members 39 and 40, because by our system we have by-passed the initial rudder mechanism in the drive from hand wheel H to the trolleys T and T'.

It will be observed that the shaft S of rotor R is supported in only two fixed bearings 54 and 54'. As hereinbefore described, spring 13' normally maintains clutch member 13 in engagement with plate 17, the thrust on said plate being counter-balanced by the equal and opposite thrust delivered through spring 13' to sleeve 12 and thence through the tightly-fitting bearing 55 to a point on the shaft S. Since both the thrust pressure and its equal and opposite pressure are delivered to intermediate points on shaft S, none of said thrust pressure reaches said end-bearings.

Summing up the advantages of the above described construction, it will be seen, first, that we have provided a direct, minimum-load connection between the rotor shaft and the trolleys so that very little load is placed upon the rotor; second, we have provided a two-part motor wherein the fields act as a follow-up to restore the rotor to initial position; third, this construction enables the operator to turn the fields by hand through a given angular distance and thus obtain a given angular displacement of rudder; and fourth, in shifting from automatic to hand steering, we short-circuit the initial rudder mechanism so as to render it unnecessary first to reduce the initial rudder setting to zero before instantaneous hand steering can be effected.

Figure 8:
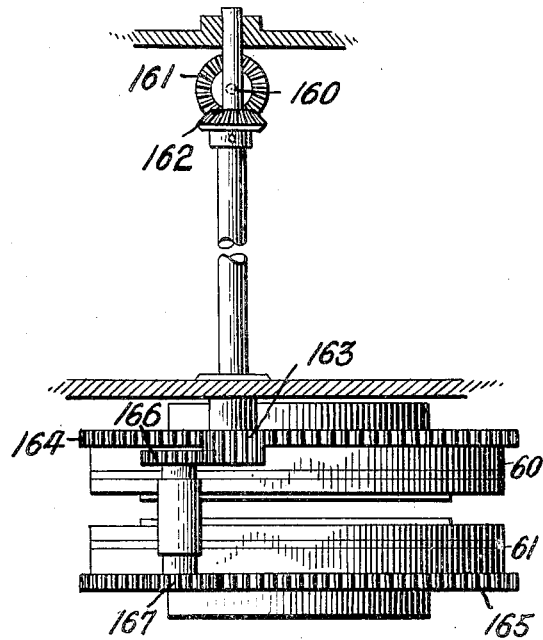
Fig. 8 is an enlarged view of the weather adjustment or rudder activity setting disclosed in the Figs. 4 to 6 form of the invention.

With further respect to the device disclosed in Fig. 2, we have shown a rudder activity or weather adjustment setting controlled from a knob 57 which operates through gearing 58-59 to rotate the upper contact ring 60 with which the trolley T engages, and at the same time, through gearing, disclosed more in detail in Fig. 8, we may rotate also ring 61, with which trolley T' engages, in the opposite direction so that the degree of overlapping of the insulation strips carried by said rings may be increased or decreased to provide for lesser or greater sensitivity of response of the steering mechanism, all as described in the patent to Elmer A. Sperry, Jr., No. 1,779,991 dated October 28, 1930. It will be understood that the current through the rudder-operating motor lies through both trolleys and both rings 60 and 61.

The position of the shaft S of motor M may be indicated by an indicator 65 registering with an index 66, while the position of the rudder as determined by the operation of the rudder operating motor may be indicated on scale 67 by an indicator 68 actuated from motor 30 through any suitable driving connection such as gearing 31, 32, 33, 69, flexible shaft 70, and gearing 71–72 to which said pointer 68 is attached. This indicator, it should be noted, shows, when steering through wheel H, the change in rudder position desired since it is differentially actuated from the hand wheel and rudder follow-up (and also from the compass when steering automatically). Indicator 65 is brought back to zero by the rudder follow-up as soon as the rudder reaches the new position so that the helmsman knows that the rudder has followed the movements of the controller.

A somewhat different embodiment of our invention is disclosed in Fig. 3. The differences lie mainly in the type of clutch employed. Similar parts are indicated by similar numerals and only the points of differences need be here described. The motor is again indicated at M and comprises the rotatable casing C to which are fixed fields F, and the rotor R having the shaft S. Deviation of the craft from course will again cause rotation of rotor R and shaft S, and in this instance, through a one-to-two gear ratio 75, 76 to the trolleys T and T′ on the contact rings 60 and 61 through a clutch operated by handle 20 but of somewhat different construction than that of Fig. 2. In this case the clutch is a single sleeve 77 which may be operated upwardly to engage gear 76 so that the automatic drive is effected from motor M through the trolleys T—T′, or may be operated downwardly into engagement with gear 78 which meshes with gear 37 controlled by the hand-wheel H for hand steering. In this instance also the follow-up from the follow-up motor 30 lies through the differential D and the initial rudder mechanism including the lost motion 39–40 to the casing C through the gearing 80, 81, the said initial rudder setting and gears such as 82, 83 and pinion 84 on the casing C. Indicators 65 and 68 again indicate the position of the contact trolleys T—T′ and the rudder, respectively.

In this form also it will be seen that the clutch member 77 is normally operated upwardly by spring 87 and the thrust is not borne by the end bearings supporting the shaft 85 carrying the trolleys T—T′ but is taken up by the collars 86 and 89 which take up the thrust pressure and its equal and opposite pressure, respectively, said pressures being transmitted to said collars by the spring. In this case also the initial rudder mechanism is by-passed during hand steering which is effected directly from hand-wheel H through differential D, gears 37 and 78, clutch member 77 and shaft 85, to the trolleys T—T′.

The same principles hereinbefore enunciated with respect to the forms of the invention disclosed in Figs. 2 and 3, apply also to the form of the invention disclosed in Fig. 5. Here again the motor M is provided with a rotatable casing C as well as with rotating shaft S. The shaft S again operates directly to the trolleys without the interposition of appreciable load through the one-to-two gearing 100–101 and clutch members 102–103 to the shaft 104 which carries the trolleys T and T′ in engagement with rings 60 and 61. The follow-up from the follow-up motor lies through gearing disclosed more clearly in Fig. 6 and comprising the gear 110 whose shaft extends upwardly and carries a bevel gear 111 meshing with bevel gear 112 on whose shaft is provided a worm 115 shown also in Fig. 5, said worm meshing with wormwheel 116, keyed to sleeve 117 extending into a differential D′ to cause rotation of a sleeve 118 extending out of the other side of said differential and keyed to a gear 119 meshing with gear 120 whose shaft extends downwardly and carries gear 121 meshing with gear 122 and pinion 123 which engages the pinion 124 carried by the casing C.

The movement of the said follow-up mechanism which indicates also the degree of rudder operation may be indicated upon indicator 68′ which may be actuated from the sleeve 117 through gearing such as 130–131–132. The position of the contactors may be indicated by index 65′ carried at the upper end of shaft 104.

In this form of the invention if it is desired to change the course during automatic steering, hand-wheel H is operated to operate through shaft 135 and gearing 136–137 to the casing 138 of differential D′ which will also cause movement of member 118 at the other side of said differential D′ to shift the casing C and the fields F and thus drag the shaft S around to the new position to cause operation of the rudder.

When it is desired to steer by hand, the clutch member 103 is operated upwardly to cause said member to engage the gear member 119. The shaft S is thus rendered ineffective to control trolleys T and T′ and the drive to said trolleys is effected directly from hand wheel H through shaft 135, gears 136–137 to rotate the casing 138 of differential D′ and member 118 to rotate gear member 119 and through clutch 103 to rotate shaft 104 and the trolleys T—T′. In this instance also it will be seen that the clutch member 103 is normally held by spring 90 in engagement with clutch member 103 for rendering the automatic steering effective, and the thrust pressure is not borne by the end bearings of shaft 104 but rather is neutralized by causing said pressure and its equal and opposite reaction to act through springs 90 upon the two collars 91 and 92, respectively, pinned to the shaft 104 at points intermediate the end bearings.

Figure 9:
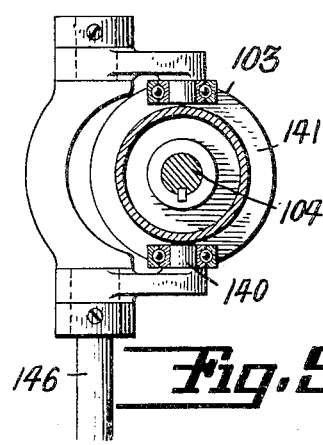
Fig. 9 is a horizontal section through a detail of the clutch-operating mechanism shown in Figs. 5 and 6.

For operating said clutch 103 we provide a fork 140 engaging in a channel 141, said fork having roller bearings for supporting the clutch member 103 when engaged for hand steering, as disclosed in Fig. 11. To actuate the clutch member to automatic and hand steering positions respectively, we may provide the control knob marked "gyro", as shown in Figs. 4 and 6, which operates through gearing indicated at 143, 144, 145, to a rocker shaft 146 carrying the said fork member 140 (see Fig. 9).

As in the forms of the invention shown in Figs. 2 and 3, there is included in the follow-up drive the initial rudder mechanism which is included between the gears 120 and 121 as shown in the enlarged view, Fig. 7. It will be seen in said view that the gear 120 operates through the lost motion connection 39–40 to drive the gear 121. The setting of the degree of initial rudder, that is, the amount of lost motion between members 39–40, is accomplished in the same way as shown in Figs. 2 and 3, that is to say, by a cam member 51 operating on a carriage 52, in which is fixed the member 39, against the action of a spring 53. Cam 51 may be operated from a knob marked "initial rudder" in Fig. 4, operating through gears 150 and 151, the former operated from the shaft 152 of the initial rudder knob and the latter having mounted on its shaft the cam 51.

As in all previous forms there is a rudder activity or weather adjustment marked in Figs. 4 and 6 with the notation "Rudder activity". This adjustment consists in relatively rotating the rings 60 and 61 as hereinbefore described and as shown in the said Sperry patent, to vary the degree of overlapping of the insulated portions of said ring in order to create a smaller or greater dead section to increase or decrease the sensitivity of response of the rudder to deviations of the craft from course. The relative rotation of said rings 60 and 61 may be accomplished in this form by means of a knob 160, on the shaft of which is mounted a gear 161 which meshes with a gear 162 (see Figs. 6 and 8) extending downwardly and having a gear 163 at its other end meshing with an annular rack 164 on the outer periphery of the ring 60. Said gear 163 may also be geared to an annular gear 165 on the periphery of ring 61 and so geared thereto as to turn it in the reverse direction to that of ring 60. This is accomplished by causing gear 163 to mesh with an intermediate gear 166 mounted on a shaft which carries at its opposite end a pinion 167 meshing with said gear 165. It will now be seen that operation of knob 160 will rotate rings 60 and 61 in opposite directions to vary the sensitivity of response, in other words, to cut down or increase the rudder activity.

It will be seen that this form of the invention is in no sense different from the forms hereinbefore described insofar as it embodies the novel features of the invention. In this instance also, when the clutch member is operated upwardly for hand operation by actuation of handwheel H, the drive does not include the initial rudder mechanism and, therefore, it is not necessary to set said mechanism at zero reading, that is, at zero lost motion.

Figure 10:
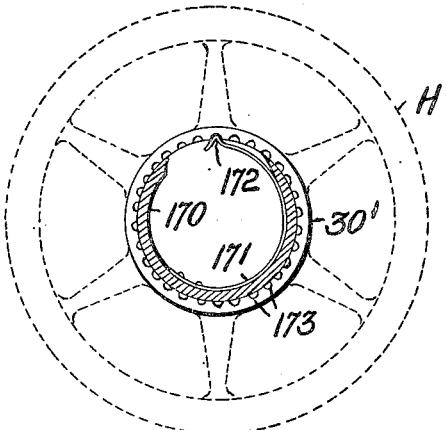
Fig. 10 is a vertical section through the hand steering wheel whereby hand control of the steering mechanism is effected.

The handwheel H may be provided with an interior flange 170, upon which is fixed a spring 171 having a notched portion 172 (see Fig. 10) which is adapted to engage in one of a series of grooves 173 on the interior of scale member 175 to cause said member to move integrally with hand-wheel H. When it is desired to change the relationship between the hand-wheel and the scale-member the latter is held while the former is rotated to cause the detent to engage the proper groove. The scale on member 175 registers with a fixed index 176. The gearing between hand-wheel H and the casing of motor M is such that scale 175 indicates the exact angle of rudder movement desired, while the indicator 68' shows the response of the rudder to the transmitted order.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In combination with a dirigible craft having a rudder, an electric controller for steering said craft, compass controlled means for normally governing said controller, hand-operated means for also governing said controller, and a lost-motion mechanism located only in said compass-controlled means whereby ready control of the ship through hand steering is not interfered with by the said lost motion mechanism.

2. In combination with a dirigible craft having a compass and a rudder, automatic means for steering said craft including a two-part electric contact control, means whereby one of said parts is operated from said compass, a follow-up drive from the rudder to the other of said parts including a lost-motion connection, and hand-operated means for actuating said controller without passing through said lost motion connection.

3. In an automatic steering mechanism for dirigible craft having a compass and a rudder, means for operating said rudder including a rotatable shaft, means including an A. C. repeater motor whereby said shaft may be operated automatically from said compass, hand-operated means for operating said shaft, and a spring pressed clutch normally connecting said automatic means to said shaft and operable to disconnect said automatic means and connect said hand-operated means, said clutch including means for preventing transmission of the thrust pressure to the bearings of said shaft when said automatic means is rendered effective.

4. In an automatic steering mechanism for dirigible craft having a compass and a rudder, means for operating said rudder including a rotatable shaft, means including an A. C. repeater motor whereby said shaft may be operated automatically from said compass, hand-operated means for operating said shaft, and a spring pressed clutch normally connecting said automatic means to said shaft and operable to disconnect said automatic means and connect said hand-operated means, said clutch including means for preventing transmission of the thrust pressure to the bearings of said shaft when said automatic means is rendered effective, said last-named means including means for imparting said thrust pressure and an equal and opposite reaction pressure to intermediate points on said shaft.

5. In an automatic steering mechanism for dirigible craft having a compass and a rudder, means for operating said rudder including a rotatable shaft, means including an A. C. repeater motor whereby said shaft may be operated automatically from said compass, hand-operated means for operating said shaft, and a spring pressed clutch normally connecting said automatic means to said shaft and operable to disconnect said automatic means and connect said hand-operated means, said clutch including means for preventing transmission of the thrust pressure to the bearings of said shaft when said automatic means is rendered effective, said last-named means including collars mounted on said shaft intermediate the end bearings for taking up the said thrust pressure and its equal and opposite reaction pressure respectively.

6. In an automatic steering mechanism for dirigible craft having a compass and a rudder, means for operating said rudder including a rotatable shaft, means including an A. C. repeater motor whereby said shaft may be operated automatically from said compass, hand-operated means for operating said shaft, and a spring pressed clutch normally connecting said automatic means to said shaft and operable to disconnect said automatic means and connect said hand-operated means, said clutch including means for preventing transmission of the thrust pressure to the bearings of said shaft when said automatic means is rendered effective, said last-named means including collars mounted on said shaft intermediate the end bearings for taking up the said thrust pressure and its equal and opposite reaction pressure respectively, and a spring engaging one of said collars and normally pressing said clutch to exert an equal thrust pressure on the other of said collars.

7. In an electric steering gear for ships having a rudder, means for operating said rudder including a two-part controller for controlling the operation of said rudder, hand-actuated means for controlling one of said parts, a follow-back from the rudder to the other of said parts, there being an indicating means actuated from said hand-actuated and follow-up means to indicate relative position whereby the readings of said indicating means represents actual anticipated angular displacement of said rudder.

8. In an electric steering gear for ships having a rudder, means for operating said rudder including an A. C. motor having a rotatable armature and a rotatable field for controlling the operation of said rudder, hand-actuated means for controlling one of the parts of said motor, a follow-back from the rudder to the other of said parts, there being an indicator differentially actuated from said hand-actuated and follow-up means, whereby the readings of said indicator represent actual anticipated angular displacements of said rudder, and a rudder indicator actuated from said follow-back system and mounted adjacent said first-named indicator to show the actual position of the rudder.

9. In an automatic steering gear for ships, the combination with the rudder, of an electrical controller, compass controlled means for normally actuating said controller, a hand wheel for actuating said controller to change course, a follow-up from the rudder also actuating said controller, and a zero reader indicator actuated differentially from said compass means, hand wheel and rudder follow-up whereby initial rudder changes are indicated.

In testimony whereof we have affixed our signatures.

FREDERICK S. HODGMAN.
ELMER A. SPERRY, Jr.